United States Patent [19]

Ochsenfeld et al.

[11] 4,197,195

[45] Apr. 8, 1980

[54] METHOD FOR MINIMIZING THE ORGANIC WASTE IN AQUEOUS PRODUCT STREAMS PRODUCED IN LIQUID-LIQUID EXTRACTION PROCESSES

[75] Inventors: Wilhelm Ochsenfeld, Karlsruhe-Waldstadt; Jürgen Schön, Linkenheim, both of Fed. Rep. of Germany

[73] Assignee: Gesellschaft fur Kernforschung m.b.H., Karlsruhe, Fed. Rep. of Germany

[21] Appl. No.: 849,625

[22] Filed: Nov. 8, 1977

[30] Foreign Application Priority Data

Nov. 16, 1976 [DE] Fed. Rep. of Germany ....... 2652164

[51] Int. Cl.$^2$ ..................... B01D 11/04; B01D 15/06
[52] U.S. Cl. ..................................... 210/21; 210/26; 210/34; 210/40
[58] Field of Search ..................... 203/41; 210/21, 26, 210/30 R, 32, 34, 40

[56] References Cited

U.S. PATENT DOCUMENTS

| 2,564,717 | 8/1951 | Olsen | 210/26 |
| 2,585,490 | 2/1952 | Olsen | 210/26 |
| 3,531,463 | 9/1970 | Gustafson | 210/24 |
| 4,059,671 | 11/1977 | Schmieder et al. | 210/21 |
| 4,061,566 | 12/1977 | Modell | 210/32 |

FOREIGN PATENT DOCUMENTS

2244306  9/1972  Fed. Rep. of Germany .

OTHER PUBLICATIONS

Lerch, R. E., "Carbon Bed Treatment of Aqueous Plant Waste for Removal of Organic Materials", Batelle Memorial Institute, Pacific Northwest Laboratory, Richland, Washington, Report No. BNWL-1109, Aug. 1969.

*Primary Examiner*—Charles N. Hart
*Assistant Examiner*—Ivars Cintins
*Attorney, Agent, or Firm*—Spencer & Kaye

[57] ABSTRACT

A method is provided for minimizing the organic waste found in an aqueous process stream of products and refined products from a liquid-liquid extraction process. The aqueous process stream contains small quantities of interfering substances in the form of an organic extraction agent and decomposition products of the extraction agent and is treated with an agent which selectively, practically quantitatively and reversibly sorbs the interfering substances. This agent is a macroporous sorption resin based on polystyrene cross-linked with divinyl benzene. The sorption resin, after being charged with the interfering substances, is regenerated by being brought into contact with a regenerating solvent. The regenerating solvent is then separated from the sorption resin and subjected to a distillation. The distillate consists of pure solvent and is put back into circulation to regenerate sorption resin. The extraction agent obtained as the distillation residue is recirculated, after dilution with a dissolving diluent, and returned into circulation in the extraction process.

9 Claims, No Drawings

METHOD FOR MINIMIZING THE ORGANIC WASTE IN AQUEOUS PRODUCT STREAMS PRODUCED IN LIQUID-LIQUID EXTRACTION PROCESSES

BACKGROUND OF THE INVENTION

The present invention relates to a process for minimizing the organic waste found in streams of aqueous products and streams of refined products in liquid-liquid extraction processes.

In a liquid-liquid extraction process, considerable process malfunctions may occur during further processing of aqueous phases separated from an extracting organic liquid medium when these aqueous phases still contain small quantities of extraction agents or decomposition products thereof in dissolved and/or finely suspended form and are concentrated by way of evaporation before they are processed further.

This applies in particular for extraction processes for instance the Purex or Thorex processes which are employed to reprocess irradiated nuclear fuel and/or breeder materials. The most customary reprocessing process at present is the Purex process which comprises a plurality of extraction cycles to recover valuable materials, such as uranium and plutonium, from the spent nuclear fuel. To better clarify the multitude of sometimes complicated process steps in such a process, it is the custom to combine several process steps to so-called cycles at the ends of which the materials, such as uranium or plutonium for example, are present in an aqueous solution. As a rule, the recovery is carried out by dissolving the fuel elements, usually in nitric acid, to form an aqueous solution containing uranium, plutonium, fission products, and/or breeder materials. The aqueous solution then is treated in the first extraction cycle in which the uranium and/or plutonium are extracted from the aqueous solution by bringing the aqueous solution into contact with an organic extraction medium. During this extraction, the fission products remain in the aqueous solution while the uranium and, if present the plutonium are simultaneously separated from the aqueous solution. The organic extraction medium generally comprises a mixture of (1) an organic extraction agent, such as an organophosphorus acid ester, for example tri-n-butyl phosphate (TBP), which serves as the active extractant and (2) a diluent, such as an aliphatic hydrocarbon (alkane). After the extraction into the organic extraction medium, the uranium and plutonium in the organic extract can be re-extracted to separate aqueous stripping solution to complete the first extraction cycle. This re-extraction can be achieved by first stripping the plutonium from the organic extract into an aqueous solution and then stripping the uranium from the organic extract into an aqueous solution.

The resulting two aqueous streams are product streams from the first extraction cycle and each of these streams can then be subjected to a second or fine extraction cycle to bring about further purification. In the second extraction cycle, each of the uranium and plutonium aqueous solutions are contacted with an organic extraction medium, which can again comprise TBP, to extract the uranium and plutonium in these solutions. Thereafter, the uranium and plutonium in the organic phases are again re-extracted into aqueous stripping solutions which comprise the fine aqueous product streams containing refined products from the second extraction cycle. An additional extraction cycle is sometimes introduced before the fine purification to produce a further purification for uranium and plutonium.

The aqueous solutions of products and refined products obtained at the end of the various extraction cycles contain small quantities of the organic extraction agent, such as TBP, and the extraction agent is in part hydrolytically decomposed during the concentration process before further processing of the solutions. With TBP, the resulting hydrolysis products are dibutyl phosphorus acid ester (HDBP), monobutyl phosphorus acid ester ($H_2MBP$) and $H_3PO_4$. The resulting hydrolysis products may lead to considerable process malfunctions, e.g. clogging, increased loss of values, worsening of the fission product decontamination etc., since some corrosion and fission products form difficultly soluble precipitates with the TBP hydrolysis products and the values, mainly plutonium, are bound in a complex manner by the hydrolysis products. Without an appropriate pretreatment, the TBP carried along, and mainly its hydrolysis products HDBP and $H_2MBP$, would, moreover, be enriched in these solutions.

In order to avoid these malfunctions, a number of methods have been proposed to remove interfering substances from the aqueous product solutions, but each of these methods has drawbacks. In one such method used in the past, it has been the custom to proceed in the reprocessing of nuclear fuels by subjecting the aqueous process stream, for example, to a so-called kerosene wash in mixer settlers or pulsating columns before the evaporation. The kerosene here extracts the TBP from the aqueous phase. In the Purex process, the kerosene wash is presently being preferred. Only a few, usually not reproduceable results are available about the effectiveness of such a kerosene wash which is operated at extreme flow conditions (aqueous/organic(A/O) ratio equal to about 50 to 100/1) in hot radioactive operation.

The high flow conditions during the kerosene wash lead to hydraulic malfunctions in the extraction apparatuses, e.g. poor mixing of the phases, changes in the phase relationships, etc. These malfunctions considerably reduce the effectiveness of the kerosene wash and no uniform TBP separation is achieved.

In a second method proposed in the past to remove the traces of extraction agents from the aqueous phase, activated carbon is used as an adsorption agent to remove the traces of extraction agent by adsorption. Adsorption by activated carbon is described in detail by R. E. Lerch in the report of the Battelle Memorial Institute, Pacific Northwest Laboratory, Richland, Washington, Report No. BNWL-1109, "Carbon Bed Treatment of Aqueous Plant Waste for Removal of Organic Materials", August, 1969. The drawbacks of this sorption method are that even the most efficient types of activated carbon do not sorb selectively and can be regenerated only in part. Further, the activated carbon retains undesirable plutonium which must be recovered from the carbon to avoid Pu losses. The treatment with activated carbon thus does not make the Purex process simpler, but more complicated and thus more subject to malfunctions.

In a third method proposed in the past, the so-called steam stripping process is used to remove the traces of extraction agent. The steam stripping process is similar to a steam distillation in a laboratory and removes the small quantity of organic extraction agent from the aqueous solution. Steam stripping, however, requires a very large quantity of steam compared to the small quantity of TBP involved and thus requires greater amounts of apparatus, space and safety measures, etc. Moreover, a large quantity of contaminated exhaust steam or contaminated waste water is produced in this process.

SUMMARY OF THE INVENTION

It is a primary object of the present invention to provide a process with which the organic waste developed during the treatment of aqueous streams of products and refined products out of liquid-liquid extraction processes can be kept as low as possible without having to incur losses in values.

A further object of the present invention is to avoid the drawbacks of the known processes for removing residual extraction agents from aqueous solutions.

To achieve the foregoing objects and in accordance with its purpose, the present invention provides a method for minimizing the organic waste found in an aqueous product stream produced during a liquid-liquid extraction process employing an organic extraction medium containing an organic extraction agent comprising: treating the aqueous product stream which contains small quantities of interfering substances in the form of the organic extraction agent and decomposition products of the extraction agent with an agent which selectively, practically quantitatively and reversibly sorbs the interfering substances, the agent being a macroporous sorption resin based on polystyrene cross-linked with divinyl benzene; bringing the sorption resin, after being charged with the interfering substances, into contact with a solvent to regenerate the sorption resin; separating the regenerating solvent from the sorption resin; subjecting the separated regenerating solvent to a distillation to produce a distillate which consists of pure regenerating solvent and a distillation residue which contains the extraction agent; returning the distillate into circulation for regeneration of sorption resin, diluting the extraction agent with a dissolving diluent, and returning the so-diluted extraction agent into circulation in the extraction process as organic extraction medium.

The reduction of organic waste is accomplished in the present invention by the coaction of the following process steps: selective sorption of the interfering substances from the aqueous solution with the selected sorption resin, regeneration of the charged resin with a relatively small quantity of a regenerating solvent which can easily be removed from the resin as well as from the interfering substances, return of the completely regenerated resin, complete separation of the regenerating solvent from the eluted extraction agent by distillation, return of the regenerating solvent which has been completely separated from the eluted extraction agent, and return of the extraction agent, after dilution into the process.

In a preferred embodiment of the invention, the regenerating solvent, after it is separated from the sorption resin, is not immediately subjected to distillation, but is recycled one or more times to be used further as a regenerating solution for the sorption resin.

It is to be understood that both the foregoing general description and the following detailed description are exemplary, but are not restrictive of the invention.

DETAILED DESCRIPTION OF THE INVENTION

In the practice of the present invention, aqueous product streams which have been obtained in a liquid-liquid extraction process are treated with an agent which sorbs interfering substances which are present in the aqueous product stream. The sorption agent sorbs the interfering substances from the aqueous product stream selectively, practically, quantatively and reversibly.

The aqueous product streams which are treated in the present invention generally are those which are formed by stripping an organic extraction medium of valuable materials that the organic extraction medium has extracted from a prior aqueous phase. As discussed above, various aqueous product streams are formed at the end of each extraction cycle of the Purex process or of the Thorex process, and it is these product streams which can be treated by the process of the present invention. Thus, the product streams can be the aqueous product streams from the first extraction cycle, or subsequent extraction cycles.

The organic extraction mediums most commonly employed at present comprise a mixture of an organophosphorus acid ester which serves as the active organic extractant and an aliphatic hydrocarbon which serves as a diluent for the organic extractant. Typical hydrocarbon diluents (for instance alkane) are homologues in the range of $C_{10}H_{22}$ to $C_{13}H_{28}$, or kerosene fractions being particularly suitable. The organophosphorus acid ester extractants which are most commonly employed are trialkyl phosphates which preferably comprise about 3 to 8 carbon atoms among each of its alkyl radicals. The most used organic extractant is tri-n-butyl phosphate, hereafter referred to as "TBP".

During contact of the extraction medium with an aqueous stripping solution to form an aqueous product stream, small quantities of the extraction agent are transferred to the aqueous solution. In addition, the extraction agent gives rise to decomposition products, and these decomposition products also are present in the aqueous product stream. These small quantities of extraction agent and decomposition products thereof are present in a dissolved form or in suspension in the aqueous product stream, constitute organic contaminants in the aqueous product stream, and are the interfering substances which are removed by the sorption resin used in the present invention. With a TBP extraction agent, typical decomposition products are dibutyl phosphorus acid ester (HDBP), monobutyl phosphorus acid ester ($H_2MBP$) and $H_3PO_4$.

The sorption agent used in the present invention is a macroporous sorption resin based on polystyrene cross-linked with divinyl benzene. Preferably, the sorption resin is a polystyrene which has been cross-linked to 20 to 30 wt. % divinyl benzene in the product. The sorption resin used in the present invention can contain various aliphatic or aromatic hydrocarbons.

For example, the sorption resin can be polystyrene with 20 to 30% cross-linking with divinyl benzene, and contain 60 weight percent dodecane. Further, the sorption resin can be polystyrene with 20 to 30% cross-linking with divinyl benzene and contain 60 weight percent toluene.

In addition, the sorption resin can be a polystyrene with 20 to 30% cross-linking with divinyl benzene, which previously contained tri-n-butylphosphate (TBP), such as 60 percent by weight TBP, and from which the TBP has been extracted.

In an advantageous embodiment of the process of the present invention, the sorption resin is a spent polystyrene resin, cross-linked to 20 to 30 percent with divinyl benzene, which has been used for the actinide separation where TBP had been introduced into the polymerization mixture during the manufacture of the sorption resin and from which the TBP has been extracted with methanol. Thus, the spent resins from the actinide separation need no longer be counted as waste, as customary, but can be used for another purpose after a simple pretreatment. That means that the total amount of organic waste is reduced and this not only in the treatment of aqueous solutions of products and refined products. The procedure for separation of actinides and the fabrication of the used resins is described in the German Offenlegungsschrift No. 2,244,306 (Bayer A. G. Leverkusen, FRG, filing date Sept. 9th, 1972).

The treatment of the aqueous product streams with the sorption resin to sorb and separate the extraction agent from the aqueous product stream can be effected according to the principle of extraction chromatography in columns as they are employed customarily for ion exchange processes. In this way, substantial separation of the extraction agent, such as TBP, can be realized to below the analytic proof limit. Together with the TBP, the small quantity (<to angle) of HDBP present in the aqueous product stream is separated below the detection limit of HDBP by the sorption resin. This HDBP separation, in contrast to the TBP separation, is not quantitative, but the distribution coefficient of ca. the numeral 1 for the system HDBP-TBP-resin-$HNO_3$ are higher by the factor 30 than the corresponding distribution coefficients for the system HDBP-TBP-$HNO_3$-n-alkane (with the n-alkane representing the kerosene used in the past to remove organic wastes from aqueous product streams).

Tests with aqueous product solutions that have been treated with the sorption resin according to the present invention shows that, for example, TBP can be separated to below the limit of proof, i.e. to less than 10 mg TBP/l solution, by a one-time treatment with the sorption resin.

After the sorption resin is charged with the interfering substances, the sorption resin is brought into contact with a solvent which removes the interfering substances from the sorption resin and thereby regenerates the sorption resin. Regeneration permits the sorption resin to be used again for removing the interfering substances from new quantities of aqueous product streams. At least one regenerating solvent from the group of $C_6$ to $C_{13}$ saturated paraffins $C_1$ to $C_8$ branched and unbranched aliphatic alcohols, chlorinated aliphatic hydrocarbons and aromatic benzene hydrocarbons can be used to regenerate the sorption resin.

In a particularly favorable embodiment of the invention, the solvents for regenerating the sorption resin have boiling points up to 100° C. Advantageously, at least one regenerating solvent is used which belongs to the group methanol, hexane, cyclohexane, benzene or carbon tetrachloride. The process according to the invention permits easily accomplished regeneration of the sorption resin, which is charged, for example, with TBP, by washing the resin bed with only 2 to 5 times the volume of the bed of one of the above-mentioned organic regenerating solvents. The regenerated resin bed can then be used again, without further treatment, for the separation of extraction agents from aqueous solutions.

The regenerating solvent after passing through the sorption resin now contains the extraction agent such as TBP and is separated from the sorption resin.

In accordance with the present invention, the separated regenerating solvent, in the form of an extractant-containing organic solution, is subjected to a careful, gentle distillation. A vacuum distillation at temperatures below 80° C. is favorable. The distillation produces a distillate which consists of pure regenerating solvent and a distillation residue. The thus distilled and separated regenerating solvent is available for further regeneration of sorption resin. During the distillation, the extraction agent, such as TBP, which has been separated with the aid of the sorption resin from the aqueous starting solution remains as distillation residue. This extraction agent in the form of distillation residue can be diluted with a known dissolving diluent, such as the known aliphatic hydrocarbon (alkane) diluents, to a concentration customary for the organic extraction step, for example, to 10 to 40 volume percent extraction agent, can be subjected to extraction agent wash, and can then be directly recycled into the organic extraction process.

The regenerating solvent which is separated from the sorption resin and contains extraction agent need not be immediately subjected to the distillation treatment, but can first be recycled to be further used as a regenerating solution for the sorption resin. Such a recycling is not absolutely necessary. However, it may be of importance for the economy of the process to use the solvent, after regeneration of a sorption charge, i.e. after transfer of the interfering substances removed from the aqueous starting solutions (extraction agent and its decomposition products) from the sorption resin to the regenerating solvent, for regenerating further charges of charged sorption resins before it is subjected to distillation.

The superiority of the process according to the present invention over the prior art kerosene wash is obvious from the following comparison:

For 100 parts of aqueous process solution, 2 to 10 parts of kerosene are required.

The process according to the present invention can use 1 part sorption resin for 200 parts aqueous solution. The regeneration of the sorption resin generally requires 1 part resin for 3 to 5 parts of regeneration solvent. From the separated regenerating solvent, there is obtained by way of distillation 4.5 parts regeneration solvent as distillate, and 0.5 parts extraction agent as residue.

This means that from 100 parts of aqueous process solution, there is obtained, according to the prior art kerosene wash, 2 to 10 parts kerosene. In contrast, from 100 parts of aqueous process solution, there is obtained according to the present invention, 0.25 parts extraction agent.

The present invention will now be explained with several examples which clearly point up further advantages of the process according to the invention. These examples, however, are not intended to limit the invention in any way.

EXAMPLE 1

A 10 ml resin bed comprised of macroporous polystyrene, cross-linked to 20 percent with divinyl benzene, and containing 60 percent by weight of dodecane, is charged with 1 M $HNO_3$ solution containing about 450 mg TBP per liter at a flow rate of 9 times the bed volume per hour.

After a throughput of a total of 100 times the bed volume of the aqueous starting solution, the TBP concentration in the aqueous discharge of the column increases to more than 10 mg TBP per liter.

The charge in the column at this time contains 45 g TBP per liter of sorption resin. For the TBP separation, there results a phase relationship of 1 part resin to 100 parts aqueous phase.

In order to regenerate this TBP charged resin, the TBP is eluted with three times the bed volume of methanol as organic solvent, and subsequently the organic solvent is distilled out in vacuum at 40° C. Approximately 1 ml TBP-H$_2$O-HNO$_3$ remains as residue, containing 90% of the TBP extracted by the resin.

In addition to methanol, the following solvents were examined as to their suitability as regeneration agents:

| Regeneration Agent | TBP Content in 3 BV* Eluate (mg/ml) | % TBP Eluted | Weight % TBP in Distil. Residue | TBP Concentr. in 5$^{th}$ BV* Eluate (mg/ml) |
|---|---|---|---|---|
| Hexane | 12.6 | 99 | 92.1 | 0.015 |
| Cyclohexane | 13.4 | 99 | 87.9 | 0.04 |
| Benzene | 12.8 | 99 | 88.9 | 0.01 |
| Carbon tetrachloride | 12.5 | 99 | 91.9 | 0.01 |
| Methanol | 17.9 (2.3BV) | 99 | 83.7 | 0.02 |
| n-alkane** | 13.9 | 98 | — | 0.2 |

*BV = bed volume
**n-alkane n-alkane = mixture of saturated hydrocarbons (C$_{10}$ to C$_{13}$)

EXAMPLE 2

A resin bed of the same type used in Example 1 was charged under the same conditions as in Example 1. After charging, in order to regenerate the TBP charged resin, one (1) bed volume of a 5 percent TBP-n-alkane solution is passed through the resin bed. The 5 percent TBP-n-alkane solution is illustrative of the use of a recycled regenerating solvent solution which has not been subjected to distillation. The resulting eluate contains 7% TBP. Subsequently, the resin bed is washed free of TBP with 3 bed volumes of pure n-alkane solution. The resulting n-alkane solutions can be used for further regeneration of the charged resin bed.

EXAMPLE 3

Two columns each containing a sorption resin, are connected in series so that the aqueous discharge of the first column serves as the starting solution for the second column.

The first column is charged with an aqueous solution containing 0.1 M HNO$_3$ and 450 mg TBP/liter at a flow rate of 9 bed volumes per hour. After a throughput of a total of 90 bed volumes of the starting solution, the TBP concentration in the aqueous discharge of the first column rises to more than 10 mg TBP/liter, and the TBP charge of the resin at this time is 40 g TBP/liter. The aqueous discharge of the second column, however, contains a TBP concentration below the limit of proof of 10 mg TBP/liter.

After a throughput of a total of 200 bed volumes of the aqueous starting solution, the TBP concentration in the aqueous discharge of the first column rises to 170 mg TBP/liter and the charge of this column is 88 g TBP/liter resin. The TBP charge of the series-connected second column first lies at 1 g TBP/liter resin and the TBP concentration in the aqueous discharge of the second column lies at less than 10 mg TBP/liter. The first column is now eluted, as described for example, in Examples 1 or 2, while the second column is continued to be charged with the aqueous starting solution containing 450 mg TBP/liter and 0.1 M HNO$_3$. With the quasi-continuous column operation, the TBP concentration is continuously deriched from 450 mg TBP/liter to less than 10 mg TBP/liter, i.e. by at least 97%.

The phase relationship employed for the TBP separation is 1 part resin to 200 parts aqueous phase.

EXAMPLE 4

A resin bed of 10 ml is charged with 130 BV of a 1 M HNO$_3$ solution containing 400 mg TBP/liter at a flow rate of 30 BV/h.

The TBP concentration in the column discharge during and after charging lies at less than 10 mg TBP/liter.

In order to determine the value losses, 10 BV of a uranium solution containing 105 g U/liter and 0.2 M HNO$_3$ were subsequently conducted over the TBP charged resin at a flow rate of 30 BV/h.

The resin bed was washed with 3 BV of 0.1 M HNO$_3$ and the TBP was then eluted with 5 BV of hexane. The flow rate during the wash and subsequent TBP elution each was 30 BV/h.

The hexane was separated from the resin bed and subjected to a distillation. The distillation produced a distillation residue containing more than 99% of the TBP employed and 1.5 mg uranium. The TBP content of the distillation residue was 87 percent by weight.

The uranium content of the residue corresponds to a value loss of 3 mg uranium per gram of adsorbed TBP.

EXAMPLE 5

Uranium solutions containing 47 g U/liter, 0.1 M HNO$_3$ and 300 mg TBP/liter obtained from a genuine Purex process were conducted over a resin bed which had a volume of 1.4 liters. A total of 190 liters of solution were used at a flow rate of 2 to 3 liters/h. which is equal to 1.4 to 2 BV/h.

The TBP content in the discharged uranium solution lay at less than 10 mg TBP/liter. After a wash with 5 BV of 0.1 M HNO$_3$, the resin bed was washed with 5 liters (equal to 3.5 BV) of n-alkane to remove the TBP. The uranium concentration in the TBP eluate was 92 mg U/liter, which corresponds to a total uranium loss of 460 mg or 8 mg uranium per g of adsorbed TBP, respectively.

EXAMPLE 6

A uranium solution, as in Example 5, containing 47 g uranium/liter, 0.1 M HNO$_3$ and 300 mg TBP/liter was conducted over a 1.4 liter resin bed containing a sorption resin of the type of a polystyrene resin with 20% cross-linking with divinyl benzene, and a TBP content of 60 weight percent from which the TBP had been removed completely by elution with methanol.

A total of 200 liters solution were used at a flow rate of 2 to 3 liters/h equal to 1.4 to 2 BV/h.

The TBP content in the discharged uranium solution lay at less than 10 mg TBP/l. Thereafter, the procedure was as described in Example 5. The uranium concentration in the TBP eluate was 92 mg U/liter, and the resulting uranium loss was 8 mg uranium per gram of adsorbed TBP from the starting solution.

EXAMPLE 7

A 10 ml resin bed containing macroporous sorption resin from the actinide separation, whose residual TBP content has been removed by way of elution with methanol, was charged at a flow rate of 6 BV/h with 100 BV of a Pu solution containing 1.6 M $HNO_3$, 2.72 g Pu/liter, and 200 mg TBP/liter.

The Pu solution discharged from the column contained less than 10 TBP/liter. To avoid Pu losses, the TBP charged resin bed was subsequently washed with 3 BV of 0.1 M $HNO_3$. Wash solution and Pu solution together were fed to an evaporator.

The resin bed was eluted with 5 BV of methanol for regeneration. The eluate still contained 0.03% of the plutonium used, which corresponds to a value loss of 4.1 mg Pu/g adsorbed TBP.

It will be understood that the above description of the present invention is susceptible to various modifications, changes and adaptations, and the same are intended to be comprehended within the meaning and range of equivalents of the appended claims.

What is claimed is:

1. Method for minimizing the organic waste found in an aqueous product stream produced during a liquid-liquid extraction process for reprocessing spent nuclear fuel and/or breeder materials, the liquid-liquid extraction process employing an organic extraction medium containing an organic extraction agent, comprising:
   (a) treating the aqueous product stream, said stream containing small quantities of interfering substances in the form of the organic extraction agent, and decomposition products of the organic extraction agent, with a sorption agent which selectively, substantially quantitatively and reversibly sorbs the interfering substances, the sorption agent being a macroporous sorption resin based on polystyrene cross-linked with divinyl benzene;
   (b) regenerating the sorption resin, after it has been charged with the interfering substances, bringing the sorption resin into contact with a regenerating solvent;
   (c) separating the regenerating solvent from the sorption resin;
   (d) subjecting the separated regenerated solvent to a distillation to produce a distillate which consists of pure regenerating solvent and a distillation residue which contains the extraction agent;
   (e) returning the distillate into circulation for regeneration of sorption resin;
   (f) diluting the extraction agent with a dissolving diluent; and
   (g) returning the so-diluted extraction agent into circulation in the extraction process as organic extraction medium.

2. Method as defined in claim 1, wherein the sorption resin is polystyrene with 20 to 30 wt % cross-linking with divinyl benzene, and contains 60 weight percent dodecane.

3. Method as defined in claim 1, wherein the sorption resin is polystyrene with 20 to 30 weight % cross-linking with divinyl benzene, and contains 60 weight percent toluene.

4. Method as defined in claim 1, wherein the sorption resin is a polystyrene with 20 to 30 weight % cross-linking with divinyl benzene, which resin previously contained 60 percent by weight tri-n-butylphosphate and from which the tri-n-butylphosphate has been extracted.

5. Method as defined in claim 1, wherein the sorption resin is a spent polystyrene resin with 20 to 30% cross-linking with divinyl benzene obtained from an actinide separation process, the sorption resin being a resin where TBP had been introduced into the polymerization mixture during the manufacture of said sorption resin and from which the TBP has been extracted with methonol after the actinide separation.

6. Method as defined in claim 1 wherein the regenerating solvent is at least one compound selected from the group consisting of $C_6$ to $C_{13}$ saturated paraffins, $C_1$ to $C_8$ branched and unbranched aliphatic alcohols, chlorinated aliphatic hydrocarbons, cyclohexane and aromatic benzene hydrocarbons.

7. Method as defined in claim 6 wherein the solvent used to regenerate the sorption resin has a boiling point of up to 100° C.

8. Method as defined in claim 7 wherein at least one solvent selected from the group consisting of methanol, hexane, cyclohexane, benzene and carbon tetrachloride is used as the regenerating solvent.

9. Method as defined in claim 1 wherein the regenerating solvent, after it is separated from the sorption resin, is not immediately subjected to distillation, but is recycled at least once to be used further as a regenerating solution for the sorption resin.

* * * * *